(12) United States Patent  
Hirasawa et al.

(10) Patent No.: US 8,969,723 B2  
(45) Date of Patent: Mar. 3, 2015

(54) ELECTRIC JUNCTION BOX

(71) Applicant: Yazaki Corporation, Tokyo (JP)

(72) Inventors: Hitoshi Hirasawa, Makinohara (JP); Yoshihito Imaizumi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/077,337

(22) Filed: Nov. 12, 2013

(65) Prior Publication Data

US 2014/0131061 A1    May 15, 2014

(30) Foreign Application Priority Data

Nov. 14, 2012 (JP) ................................. 2012-249864

(51) Int. Cl.
*H02G 3/08* (2006.01)

(52) U.S. Cl.
CPC ..................................... *H02G 3/088* (2013.01)
USPC ............ 174/50; 174/520; 439/76.1; 439/76.2

(58) Field of Classification Search
USPC ............... 174/50, 17 R, 520, 17 VA, 59, 559; 439/535, 76.1, 76.2; 361/600, 690, 361/601, 679.01, 688, 676
See application file for complete search history.

(56) References Cited

U.S. PATENT DOCUMENTS

| | | | | |
|---|---|---|---|---|
| 5,295,842 | A * | 3/1994 | Ozaki et al. .................. | 439/76.2 |
| 5,764,487 | A * | 6/1998 | Natsume ..................... | 439/76.2 |
| 6,108,202 | A * | 8/2000 | Sumida ......................... | 361/690 |
| 6,462,270 | B1 * | 10/2002 | Depp et al. ...................... | 174/50 |
| 7,253,356 | B2 * | 8/2007 | Kiyota et al. .................. | 174/50 |
| 8,163,994 | B2 * | 4/2012 | Taniguchi et al. ........... | 439/76.2 |
| 2006/0089020 | A1 | 4/2006 | Kanamaru | |

FOREIGN PATENT DOCUMENTS

JP       2006-121880 A      5/2006

* cited by examiner

*Primary Examiner* — Angel R Estrada
(74) *Attorney, Agent, or Firm* — Locke Lord LLP (57) ABSTRACT

The invention provides an electric junction box with an enhanced thermal insulation between neighboring part-receiving chambers without causing excessive increase in the size of a case. In order to attain the objective, there is provided an electric junction box, which includes a case provided with a case body, a lower cover coupled to the lower end of the case body, and first and second upper covers and coupled to the upper end of the case body. The case includes neighboring first and second part-receiving chambers and. A through-hole is located between the first and second part-receiving chambers and extends from an upper end of the case to a lower end of the case. The through-hole has an enlarging portion, which is disposed at a lower end thereof and has increasing cross-sectional area as approaching to the lower end of the through-hole.

4 Claims, 8 Drawing Sheets

ELECTRIC JUNCTION BOX

CROSS-REFERENCE TO RELATED APPLICATIONS

This application claims priority from Japanese Patent Application No. 2012-249864 filed on Nov. 14, 2012, which is incorporated herein by reference.

BACKGROUND OF THE INVENTION

1. Field of the Invention

The invention relates to an electric junction box which is adapted to be mounted in a vehicle.

2. Background of the Invention

Figure 8:
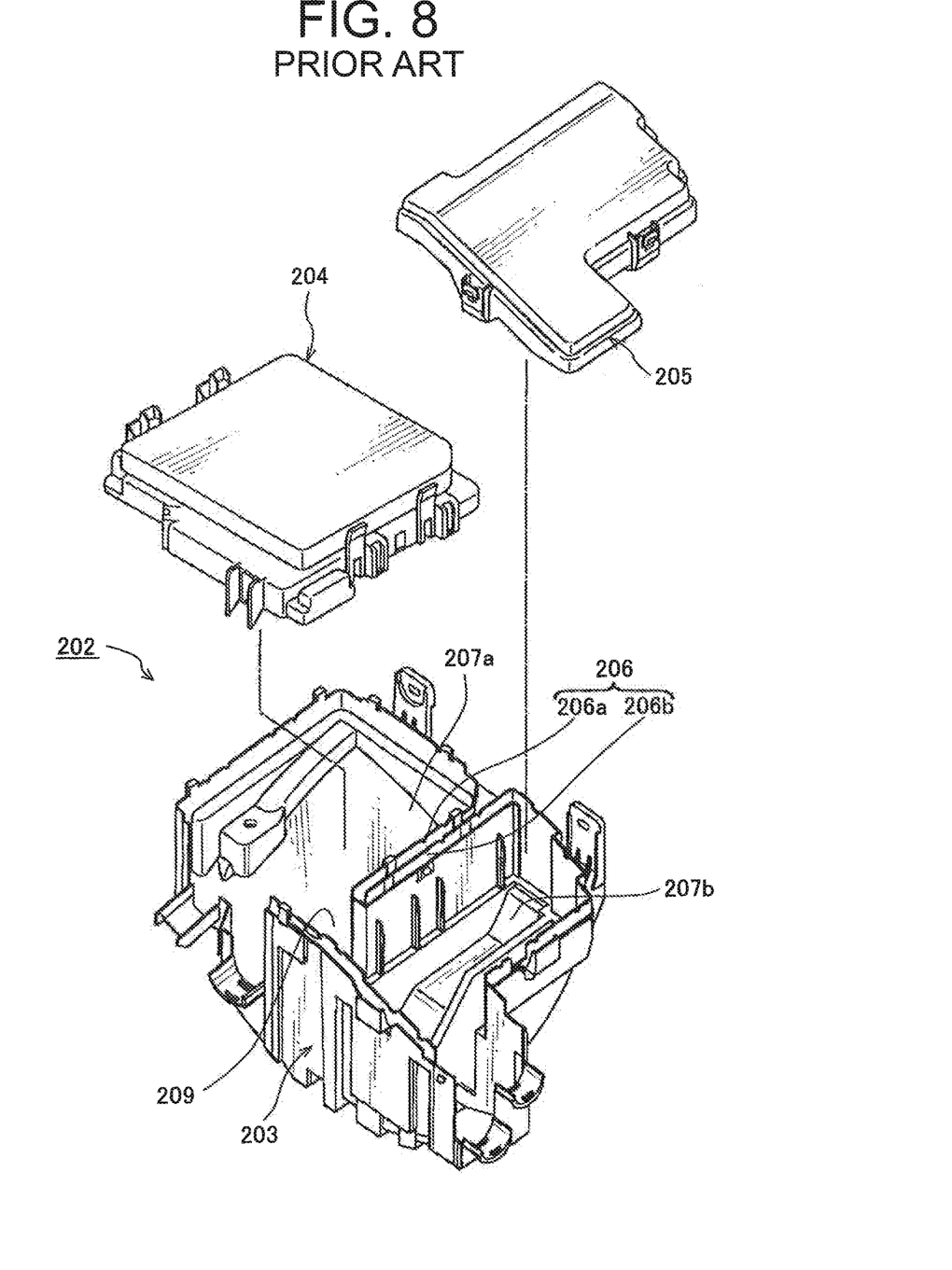
FIG. 8 is an exploded view of a conventional electric junction box.

FIG. 8 is an exploded view of a conventional electric junction box. See JP 2006-121880 A. A case 202 is a case body 203, an upper surface of which is opened, a first cover 204 and a second cover 205 disposed such that the upper surface of the case body 203 is closed.

The case body 203 has a partition wall 206 therein, which divides the interior space of the case body 203 into two part-receiving chambers 207a and 207b. The partition wall 206 is defined by two walls 206a and 206b which are slightly spaced apart from each other. Any fluid such as water which penetrates into a gap or clearance between the two walls 206a and 206b can be drained out. Parts such as a relay block are respectively received in the part-receiving chambers 207a and 207b. The part-receiving chambers 207a and 207b communicate with each other via a communication pathway 209 which is formed by removing a part of the partition wall 206. A wiring harness is arranged via the communication pathway 209 between the two part-receiving chambers 207a and 207b.

The first cover 204 is attached to the case body 203 so as to close the opening of one part-receiving member 207a. Fluid disposed over or adhered to the upper surface of the first cover 204 falls off between the two walls 206a and 206b or along the outside of the case body 203.

The second cover 205 is coupled to the case body 203 so as to close the opening of the other part-receiving member 207b. Fluid disposed on or adhered to the upper surface of the second cover 205 falls off between the two walls 206a and 206b or along the outside of the case body 203.

In the conventional electric junction box in which the interior space of the case body 203 is divided into the two part-receiving chamber 207a and 207b, as shown in FIG. 8, the partition wall 206 is defined by the two walls 206a and 206b which are slightly spaced apart from each other, and fluid adhered to the first cover 204 and the second cover 205 falls off between the two walls 206a and 206b. As such, fluid such as water can be drained from the electric junction box. For the above configuration, the conventional electric junction is made waterproof.

On the other hand, the inventors have investigated thermal insulation between the neighboring part-receiving chambers in the afore-mentioned conventional electric junction box. The inventors have found that heat generated from the part-receiving chamber is less transferred to the neighboring part-receiving chamber by adopting the above partition wall 206 formed of the two walls 206a and 206b. In other words, the partition wall 206 can be called as a double wall.

However, because the gap or clearance between the two walls 206a and 206b is very small or slight, the resulting thermal insulation effect is not thus advantageous. On the other hand, the greater the gap or clearance between the two walls 206a and 206b is, the greater the size of the case 202 is.

SUMMARY OF THE INVENTION

In view of the above, the invention provides an electric junction box having a case, the interior space of which is divided into a plurality of part-receiving chambers, with an enhanced thermal insulation between the neighboring part-receiving chambers without causing excessive increase in the size of the case.

In one embodiment, there is provided an electric junction box, which includes a case having neighboring first and second part-receiving chambers, and a through-hole located between the first and second part-receiving chambers and extending from an upper end of the case to a lower end of the case. The through-hole has an enlarging portion, which is disposed at a lower end thereof and has increasing cross-sectional area as approaching to the lower end of the through-hole.

In the one embodiment, the case may further include a case body, and a lower cover coupled to a lower end of the case body. The through-hole disposed at an area of the case body may have a constant size, and the enlarging portion may be disposed in the lower cover.

In the one embodiment, the case may further include a case body, and a lower cover coupled to a lower end of the case body. The case body may have an exposed portion which is disposed at a lower end of the case body and is not covered by the lower cover. The exposed portion may have a bottom wall which at least partly defines the case body. The exposed portion may be disposed away from the through-hole in the first or second part-receiving chamber.

DETAILED DESCRIPTION OF THE INVENTION

One embodiment of an electric junction box in accordance with the invention will be described with reference to FIGS. 1-7. The electric junction box in accordance with the invention is suited to be mounted in a vehicle and is configured to supply electric power to an electronic device mounted in the vehicle and transfer signal to the electronic device.

Figure 1:
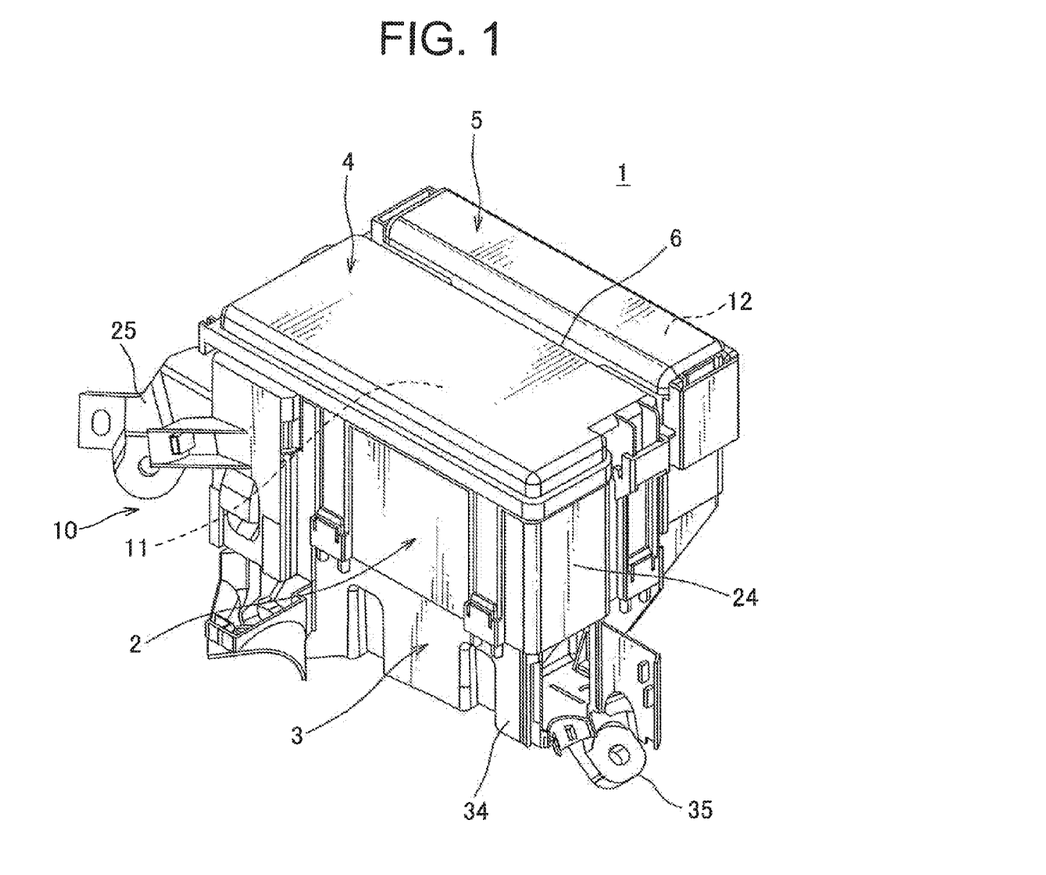
FIG. 1 is a perspective view of an embodiment of an electric junction box in accordance with the invention.
Figure 2:
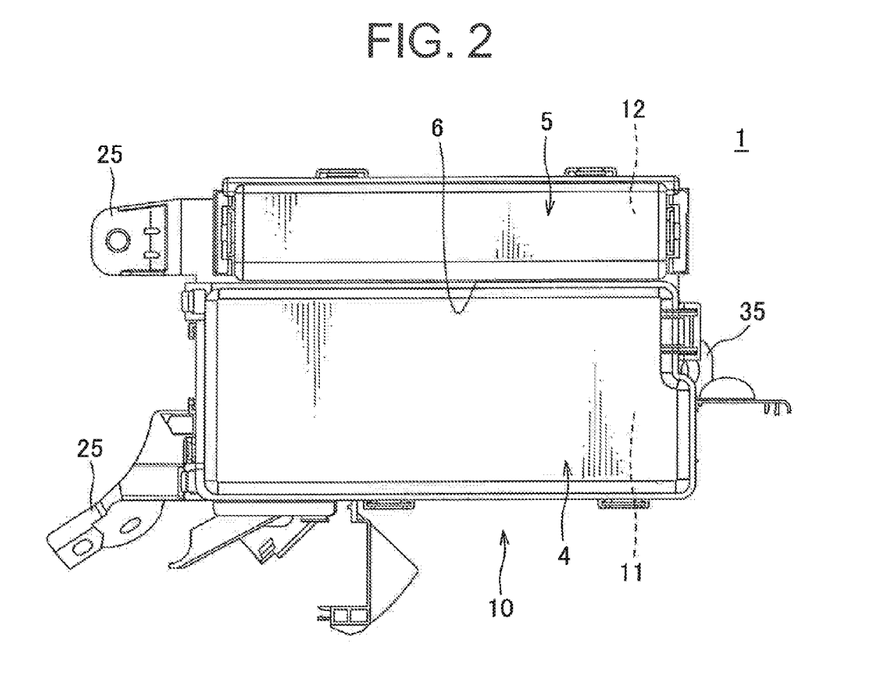
FIG. 2 is a planer view of the electric junction box of FIG. 1.
Figure 4:
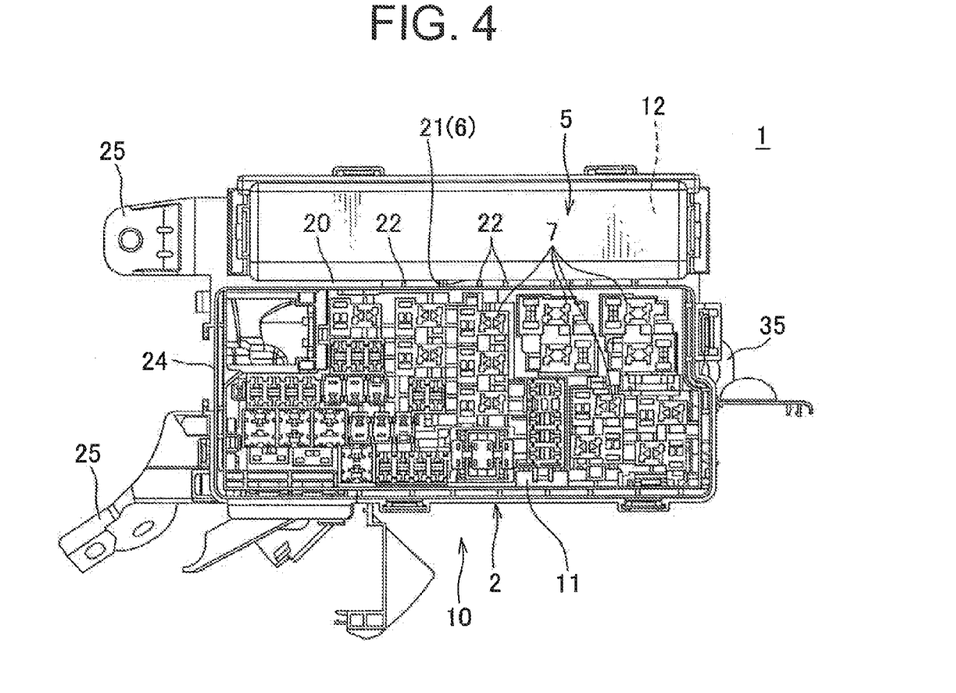
FIG. 4 is a planer view of the electric junction box of FIG. 2 with a first upper cover being removed therefrom.
Figure 5:
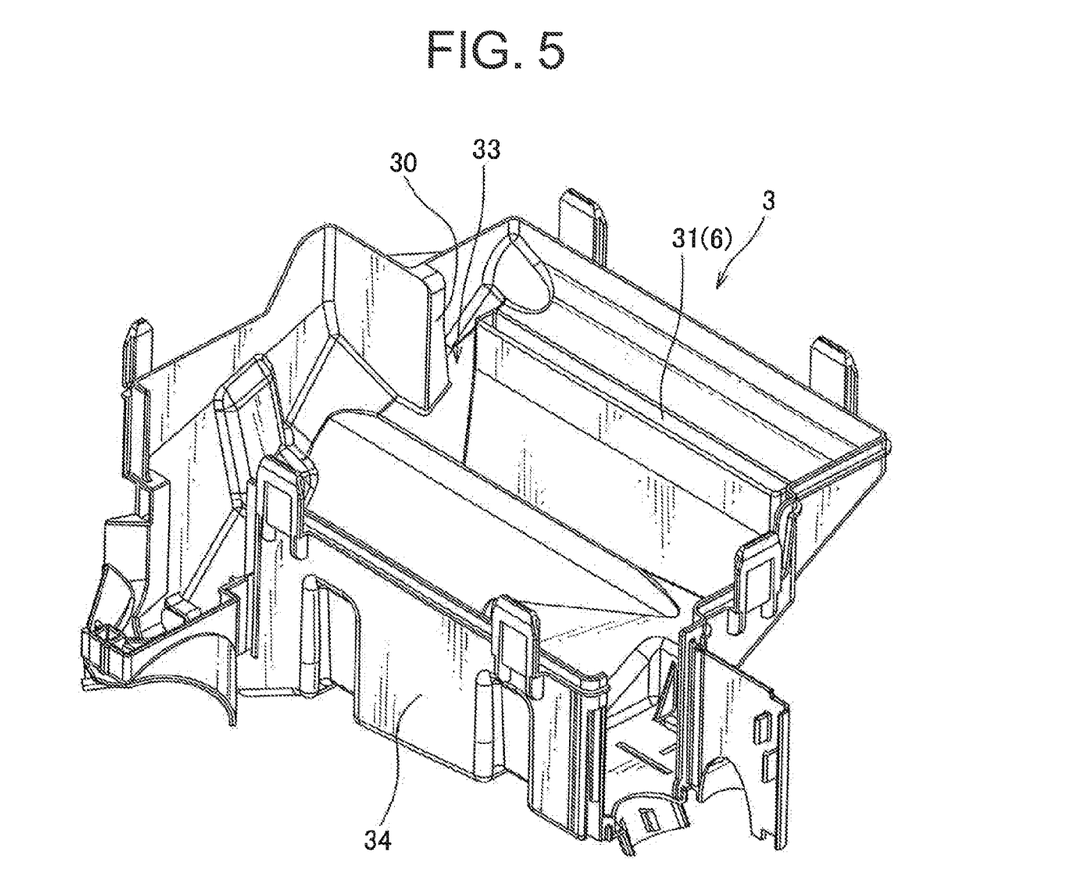
FIG. 5 is a perspective view depicting the inside of a lower cover as shown in FIG. 3.
Figure 6:
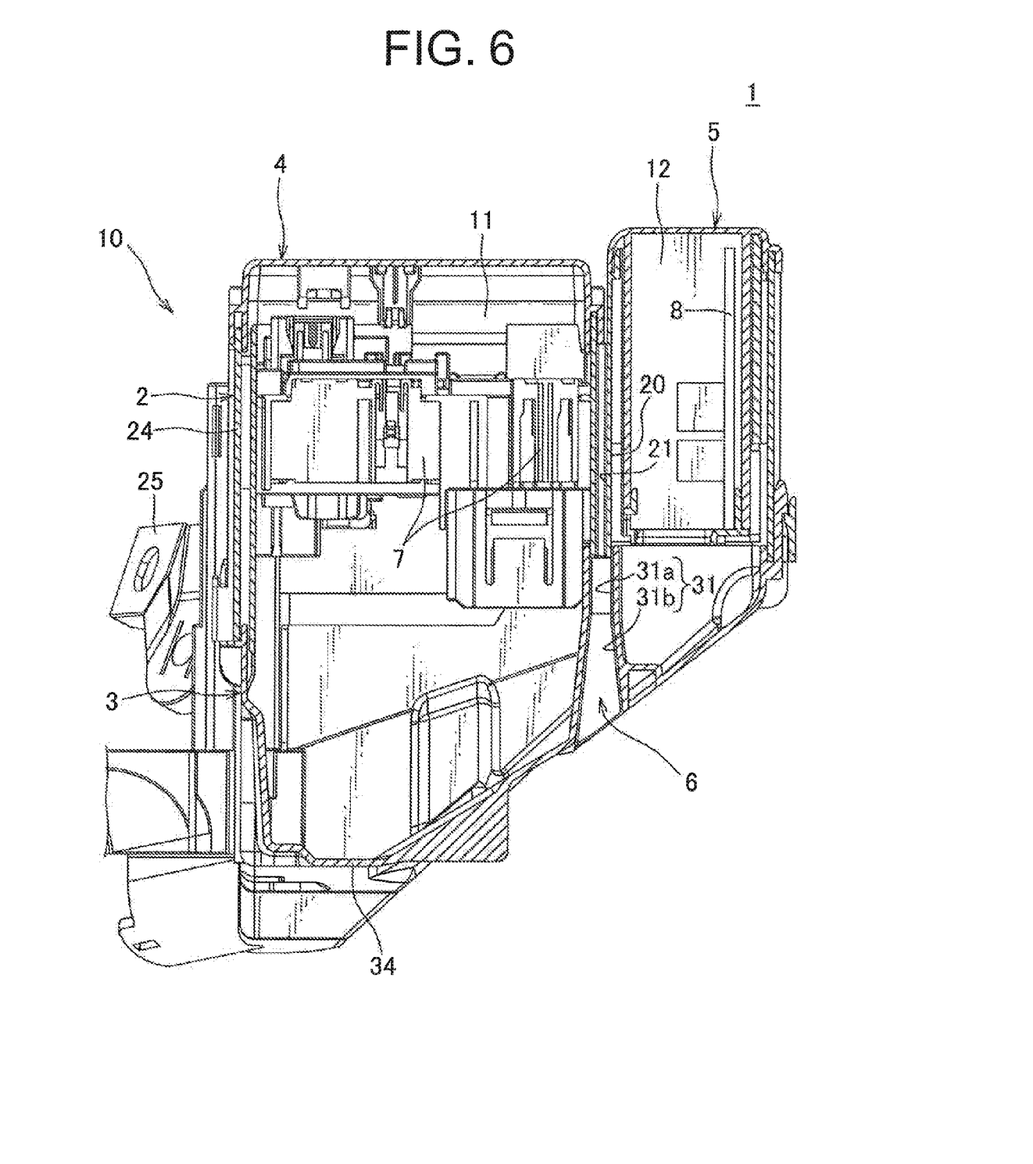
FIG. 6 is a cross-sectional view of FIG. 2 along the line A-A.

With reference to FIGS. 1 and 2, the one embodiment of the electric junction box 1 has a case 10 in which a first part-receiving chamber 11 and a second part-receiving chamber 12 are disposed adjacent to each other. Referring to FIGS. 4 and 6, the case 10 includes a case body 2, a plurality of cassette blocks 7 coupled to the inside of the case body 2 to at least partly define a first part-receiving chamber 11, a first upper cover 4 coupled to the upper end of the case body 2 to at least partly define the first part-receiving chamber 11, a second upper cover 5 coupled to the upper end of the case body 2 to at least partly define a second part-receiving chamber 12, and a lower cover 3 coupled to the lower end of the case body 2. These case body 2, the cassette blocks 7, the first upper cover 4, the second upper cover 5, and the lower cover 3 may be formed of insulating synthetic resin.

Figure 7:
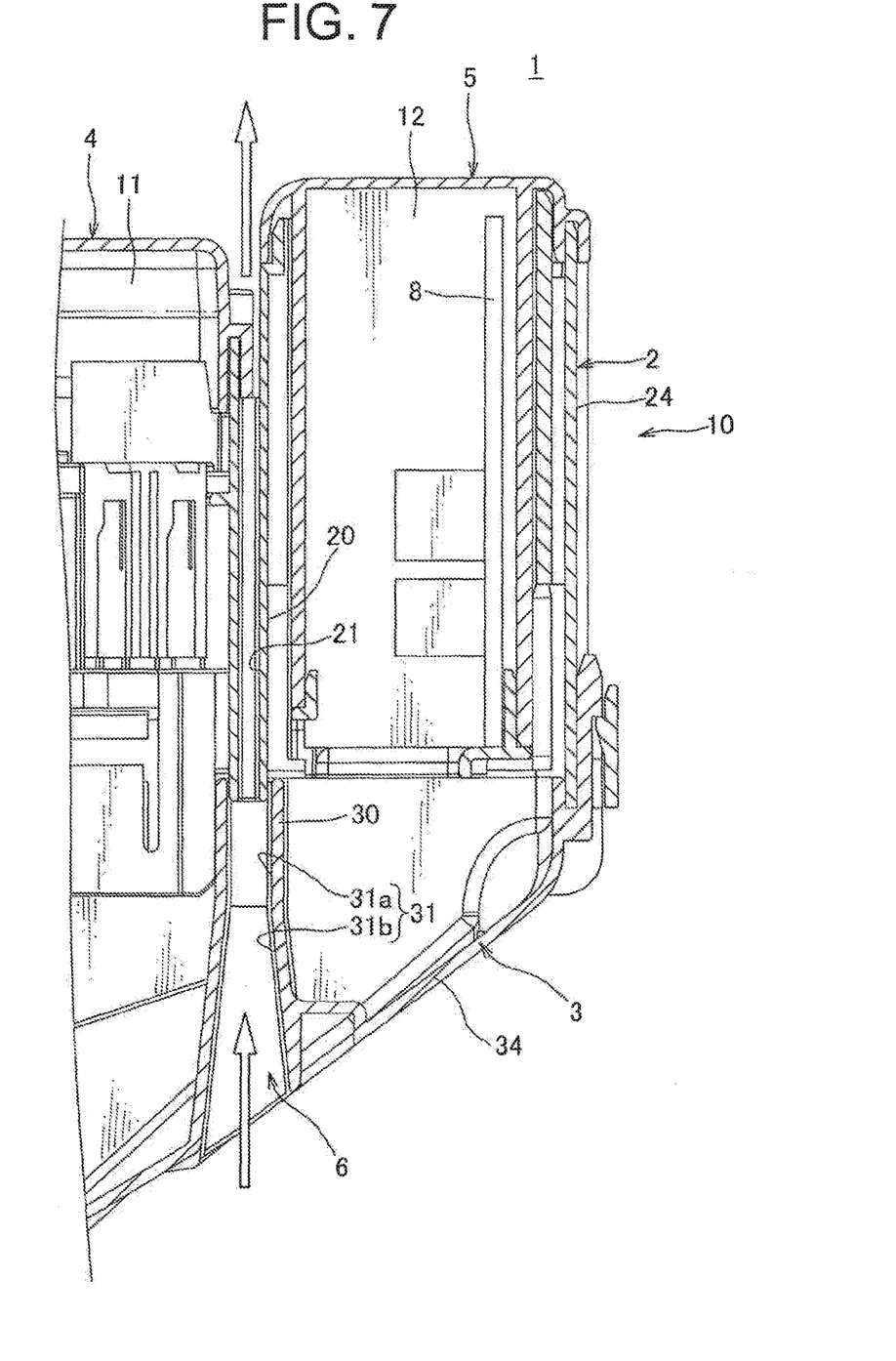
FIG. 7 is an enlarged cross-sectional view of a major section of FIG. 6.

The case body 2 includes a frame-shaped peripheral wall 24, a bracket 25 communicating with the outer surface of the peripheral wall 24, and a partition wall 20 dividing the interior (i.e., inner space) of the peripheral wall 24 into two spaces. The two spaces define a first part-receiving chamber 11 and a second part-receiving chamber 12 respectively. A first through-hole 21 is formed in the partition wall 20 such that it opens at the upper and lower ends of the case body 2. In other words, the first through-hole 21 extends between the upper end of the case body 2 and the lower end of the case body 2. Referring to FIG. 7, the size (i.e., the cross-sectional area) of the first through-hole 21 is made constant from the upper end to the lower end of the case body 2. The inside of the first through-hole 21 is provided with a plurality of reinforcing ribs 22. The first through-hole 21 at least partly defines a through hole 6, which will be described below.

The plurality of cassette blocks 7 is detachably or removably coupled to the one space inside the peripheral wall 24 which defines the first part-receiving chamber 11. Each of the plurality of cassette blocks 7 has a mounting portion to which a part such as a relay, a fuse, a fusible ring, a bus bar, a connector, and an electrical wire having a terminal can be mounted. In the embodiment, the plurality of cassette blocks 7 is formed independently of the case body 2. However, the plurality of cassette blocks 7 may be integrally formed with the case body 2.

The first upper cover 4 is box-shaped with a relatively less depth, and is coupled to the upper end of the first part-receiving chamber 11.

The second upper cover 5 is also box-shaped with a relatively less depth, and is coupled to the upper end of the second part-receiving chamber 12.

Figure 3:
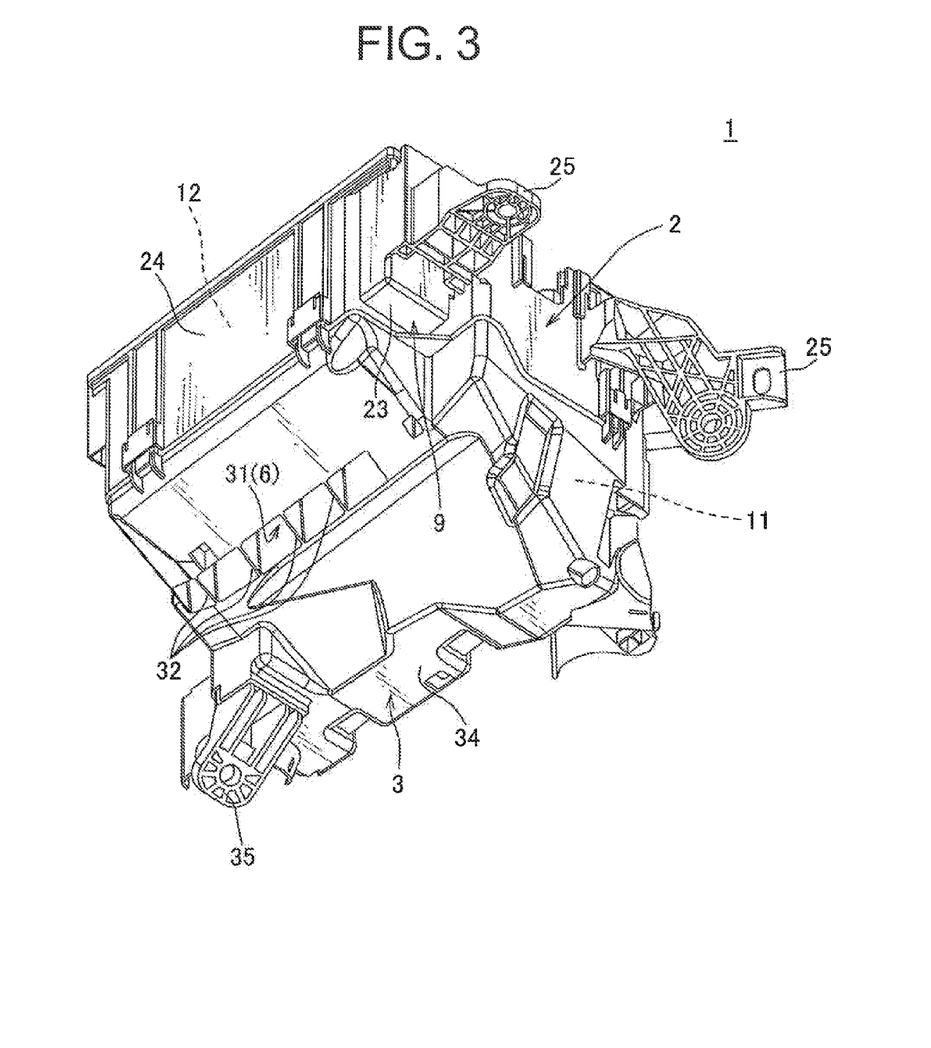
FIG. 3 is a perspective view depicting a lower end portion of the case of the electric junction box of FIG. 1.

Referring to FIGS. 3, and 6, the lower cover 3 includes a box-shaped peripheral wall (i.e., a box-shaped outer wall) 34, a bracket 35 communicating with the outer surface of the peripheral wall 34, and a partition wall 30 for dividing the interior (i.e., the inner space) of the peripheral wall 34 into two spaces. The two spaces correspond to the first part-receiving chamber 11 and the second part-receiving chamber 12 respectively. Furthermore, referring to FIG. 5, a notch 33 in communication with the two spaces is formed at one end portion of the partition wall 30. The notch 33 is configured to pass an electrical wire interconnecting the electrical part disposed in the first part-receiving chamber 11 and the electrical part disposed in the second part-receiving chamber 12 therethrough.

In the partition wall 30 excluding the notch 33 (i.e., a portion from the opposite end of the partition wall 30 to just before (just near side of) the notch 33), there is provided a second through-hole 31 opened at the upper and lower ends of the lower cover 3. In other words, the second through-hole 31 extends between the upper end of the lower cover 3 and the lower end of the lower cover 3. Referring to FIG. 7, the second through-hole 31 includes a vertical portion 31 having a substantially constant size (i.e., cross-sectional area) and an enlarging portion 31b, the cross-sectional area of which increases as approaching to the lower end of the enlarging portion 31 (i.e., the lower end of the lower cover 3). The vertical portion 31a is disposed at the upper end side of the lower cover 3, and the enlarging portion 31b is disposed at the lower end side of the lower cover 3. A plurality of reinforcing ribs 32 is disposed inside the second through-hole 31.

Furthermore, the lower end of the first through-hole 21 is located inside the vertical portion 31a of the second through-hole 31 by the attachment of the cover 3 to the case body 2. The first through-hole 21 and the second through-hole 31 define the through hole 6 as recited in the claims attached hereto. In other words, the through-hole 6 is located between the first part-receiving chamber 11 and the second part-receiving chamber 12, and is opened at the upper and lower ends of the case 10. The through-hole 6 has a constant size at an area of the case body 2. The enlarging portion 31b, the cross-sectional area of which increases as approaching to the lower end, is disposed at the lower end side of the lower cover 3.

As mentioned above, the first part-receiving chamber 11 includes the first upper cover 4, at least a part of the case body 2, the plurality of cassette blocks 7, and at least a part of the lower cover 3. Furthermore, the first part-receiving chamber 11 and the electrical part received in the first part-receiving chamber 11 are generally called as a relay box. Furthermore, the second part-receiving chamber 12 includes the second upper cover 5, at least a part of the case body 2, and at least a part of the lower cover 3. A substrate 8 in which a plurality of electrical parts is mounted is received in the second part-receiving chamber 12. The second part-receiving chamber 12 and the electrical part received in the second part-receiving member 12 are generally called as an electronic control unit or ECU. In other words, the electric junction box 1 corresponds to a combination of the relay box and the electronic control unit.

In accordance with the above electric junction box 1, because the through-hole 6 is formed between the first part-receiving chamber 11 and the second part-receiving member 12, heat generated from each of the first and second part-receiving chambers 11, 12 is hardly or less transferred to the neighboring part-receiving chamber. Furthermore, because the through-hole 6 is opened at the upper and lower ends of the case 10 (i.e., the through-hole 6 extends between the upper end of the case 10 and the lower end of the case 10), heated air inside the through-hole 6 upward moves and is released or exhausted out of the through-hole 6. At the same time, cool or fresh air is upwardly supplied into the through-hole 6 from the lower side (end) of the through-hole 6. As a result, the heat generated from each of the part-receiving chambers 11 and 12 can be efficiently released or dissipated. Furthermore, the lower end side of the through-hole 6 forms the enlarging portion 31b, which facilitates supply or entry of fresh cool air into the through-hole 6. For the reasons, thermal insulation effect between the first and second part-receiving chambers 11 and 12 can be enhanced without causing excessive increase the case 1 in its size. Furthermore, because the enlarging portion 31b is formed in the lower cover 3 which has originally surplus space, the increase of the case body 2 in size can be suppressed. As a result, the overall size of the case 10 can be largely suppressed.

Any fluid such as water adhered to the first upper cover 4 and the second upper cover 5, as well as the air pass through the through-hole 6. The fluid, due to its own weight, then falls off to be released or drained out of the case 1 through the lower end of the through-hole 6 (i.e., the lower end of the case 1). Furthermore, because the lower end of the first through-hole 21 is substantially located within the vertical portion 31a of the second through-hole 31, fluid is prevented from entering or penetrating into the part-receiving chambers 11, 12 due to the assembly of the lower end of the first through-hole 21 and the upper end of the second through-hole 31.

Referring to FIG. 3, the electric junction box 1 has the exposed portion 9 which is a portion of the lower end of the case body 2, which is not covered by the lower cover 3. The exposed portion 9 has a bottom wall 23 which also at least partly defines case body 2. The exposed portion 9 is located away from the through-hole 6 in the second part-receiving chamber 12. In other words, the exposed portion 9 is disposed in the second part-receiving chamber 12 but is not adjacent to the through-hole 6. The first through-hole 21 is located immediately above the second through-hole 31, and is not located immediately above the notch 33 of the partition wall 20. Accordingly, the term "a portion which is not adjacent to the through-hole 6" used herein means a portion adjacent to the portion located immediately above the notch 33 of the partition wall 20.

As mentioned above, because the exposed portion 9 is located away from the through-hole 6 in the second part-receiving chamber 12, the corresponding portion which is a part of the second part-receiving chamber 12 but is not located adjacent to the through-hole 6 can be effectively cooled. For the reason, the transfer of heat from the corresponding portion to the neighboring first part-receiving chamber 11 can be remarkably suppressed or almost eliminated. Furthermore, the exposed portion 9 may be located away from the through-hole 6 in the first part-receiving chamber 11.

Furthermore, the aforementioned embodiments are only shown some representatives of this invention, and this invention is not limited of these embodiments. Therefore, it can be performed with several changes without deviating from the scope of this invention.

LIST OF REFERENCE NUMERAL

1 electric junction box
2 case body
3 lower cover
6 through-hole
10 case
11 first part-receiving chamber
12 second part-receiving chamber
31*b* enlarging portion

The invention claimed is:

1. An electric junction box, comprising:
a case having neighboring first and second part-receiving chambers; and a through-hole located between the first and second part-receiving chambers and extending from an upper end of the case to a lower end of the case, wherein the through-hole has an enlarging portion, which is disposed at a lower end side of the through-hole and has increasing cross-sectional area as approaching to a lower end of the through-hole.

2. The electric junction box according to claim 1, wherein the case further comprises a case body, and a lower cover coupled to a lower end of the case body, wherein the through-hole disposed at an area of the case body has a constant size, and wherein the enlarging portion is disposed in the lower cover.

3. The electric junction box according to claim 2, wherein the case body has an exposed portion which is disposed at a lower end of the case body and is not covered by the lower cover, wherein the exposed portion has a bottom wall which at least partly defines the case body, and wherein the exposed portion is disposed away from the through-hole in the first or second part-receiving chamber.

4. The electric junction box according to claim 1, wherein the case further comprises a case body, and a lower cover coupled to a lower end of the case body, wherein the case body has an exposed portion which is disposed at a lower end of the case body and is not covered by the lower cover, wherein the exposed portion has a bottom wall which at least partly defines the case body, and wherein the exposed portion is disposed away from the through-hole in the first or second part-receiving chamber.

* * * * *